United States Patent [19]

Roberts et al.

[11] 4,037,006
[45] July 19, 1977

[54] COMPOSITE PANEL-BOARD AND METHOD OF MAKING SAME

[76] Inventors: Frank William Roberts, 380 E. 7500 S., Midvale, Utah 84047; Richard Allen Roberts, 2551 Milo Way; Waldo Calvin Roberts, 4906 Regency, both of Salt Lake City, Utah 84117; Robert Howard Blanpied, 519 Barnard, Centerville, Utah 89014

[21] Appl. No.: 731,369

[22] Filed: Oct. 12, 1976

[51] Int. Cl.² .............................................. B32B 3/26
[52] U.S. Cl. .......................... 428/71; 156/45; 156/78; 156/201; 156/202; 428/58; 428/77; 428/124; 428/310; 428/314; 428/920
[58] Field of Search ............ 428/71, 58, 76, 61, 428/310, 77, 314, 315, 124, 125, 126, 920; 156/39, 40, 78, 45, 79, 201, 202

[56] References Cited

U.S. PATENT DOCUMENTS

| 3,174,887 | 3/1965 | Voelker | 156/202 |
| 3,510,391 | 5/1970 | Bolster et al. | 428/314 |
| 3,537,929 | 11/1970 | Keith et al. | 156/79 |
| 3,707,414 | 12/1972 | Wismer et al. | 428/70 |

FOREIGN PATENT DOCUMENTS

| 1,380,527 | 1/1975 | United Kingdom | 428/314 |

Primary Examiner—William J. Van Balen
Attorney, Agent, or Firm—Mallinckrodt & Mallinckrodt

[57] ABSTRACT

A composite panel-board is made up of a rigid, gypsum board, base panel having a rigid, organic plastic, foam layer formed in-situ on, self-adherent to, and essentially covering one of the broad, flat surfaces of the gypsum board base panel. A water-vapor-resistant, flame-retardant layer is adherent to and covers the otherwise exposed, broad surface of the rigid foam layer. The composite panel-board is fabricated by attaching upwardly extending edge sheets on or adjacent to the mutually opposite, side edges of the gypsum board panel so that the mutually opposite edge sheets, together with the gypsum board panel, form a trough. The upper surface of the gypsum board panel is heated to a temperature of at least about 95° F in the presence of a water unsaturated atmosphere, and then a uniform layer of a foamable, liquid, organic plastic material is applied to the upper surface of the gypsum board panel. A sheet of water-vapor-resistant, flame-retardant material is applied to the exposed surface of the layer of liquid, organic plastic material immediately following the formation of such layer on the gypsum board panel, and the foamable, liquid organic plastic material then reacts and expands to form a layer of rigid foam which is self adherent to the gypsum board panel, the sheet of water-vapor-resistant, flame-retardant material, and the edge sheets.

15 Claims, 4 Drawing Figures

COMPOSITE PANEL-BOARD AND METHOD OF MAKING SAME

BACKGROUND OF THE INVENTION

1. Field

The invention pertains to composite insulating panel-boards to be used in building construction, and in particular to composite panel-boards comprising a rigid, gypsum board, base panel having a layer of rigid, plastic foam adherant to and covering one of the broad flat surfaces of the gypsum board base panel.

2. State of the Art

Foamed plastic is a good thermal insulator, and has been used extensively in the building industry. Unfortunately, foamed plastic is, under ordinary circumstances, unable to qualify for use in some types of wall and roof constructions. To overcome the problems involving the combustibility and susceptibility to physical damage, sandwich constructions have been produced having a foamed plastic core between dense, incombustible materials such as asbestos cement board, porcelained or enameled steel, aluminum, tempered glass, and perlite board.

Generally, the sandwich constructions have been made by gluing sheets or panels to the broad, flat surfaces of a preformed, foamed slab of plastic using a separate adhesive. In U.S. Pat. No. 3,510,391, a composite insulation board is disclosed wherein a foamed urethane sheet is formed in-situ on the face of a perlite board. Problems associated with these sandwich type constructions include poor dimensional stability, inadequate adhesion between the outer facing and the foam core, and poor surface characteristics of the facer material.

A composite panel has been made by adhesively bonding of a preformed sheet of plastic to a gypsum wallboard. However, all known attempts to form the foamed plastic in-situ on gypsum board have been commercially unsuccessful due to poor adherence of the foam layer on the gypsum board, and also due to non-uniform cell formation in the foam, especially adjacent to the face of the gypsum board. When plastic foam is formed in-situ on gypsum board, large pores are formed adjacent to the face of the gypsum board, and these pores connect to each other to form worm-hole like tunnels extending outwardly from and along the face of they gypsum board.

SUMMARY OF THE INVENTION

In accordance with the present invention, a composite panel-board is provided comprising a rigid, gypsum board base panel having a self-adherant layer of foamed plastic which is formed in-situ thereon. A water-vapor-resistant, flame-retardant layer of material covers the otherwise exposed, broad surface of the foamed plastic layer, with the layer of a foamed plastic being self-adherent to the water-vapor-resistant, flame-retardant material. A visible slot extends along the mutually opposite, side-edge faces of the panel-board between the foamed plastic layer and the gypsum board base panel. The slot forms a convenient guide for positioning mechanical fasteners to the composite panel-board when the board is being installed to a supporting structure. Mechanical fasteners which are advantageously used in installing the panels of this invention are described in our copending application Ser. No. 691,609, filed June 1, 1976, and the entire contents of that application are incorporated in this application by reference. As will be evident from our copending application, the slot along the side-edge faces of the panel-board of this invention makes an ideal guide for use in positioning and inserting the applicable prong of the mechanical fastener into the side of the panel-board. The slot insures that the prong of the mechanical fastener will be properly inserted into the edge of the composite panel at the interface between the plastic foam layer and the gypsum board base panel.

The mutually opposite side-edge faces of the plastic foam layer are advantageously covered, respectively, with water-vapor-resistant, flame-retardant, edge sheets, with the edges of the foam layer being self-adherent to the edge sheets. The edge sheets are preferably formed with the edges which are adjacent to the gypsum board base panel and the plastic foam layer to form the visible slot extending along the corresponding edge faces of the composite board.

In a preferred embodiment of the invention, the width of the foam layer is controlled and maintained such that the side edges of the gypsum board base panel extend slightly beyond (preferably up to about ⅛ inch) the corresponding edge of the foam layer. Having the sides of the base panel extending slightly beyond the respective, corresponding edges of the plastic foam layer permits easy, accurate installation of the composite panels with the butt ends of the adjacent panels being in correct alignment.

The composite panel-board of this invention has exceptional dimensional stability, is an excellent thermal insulator, and is well adapted for use in construction which must meet rigorous building and fire code requirements. The present panels are capable of acting as a barrier to fire for 15 minutes or longer. The plastic foam and the skin of the gypsum board base layer have approximately the same thermal and moisture expansion characteristics which result in the good dimensional stability exhibited by the present panels. In addition, the excellent self-adhesion of the plastic foam to the skin of the gypsum board adds significantly to the stability of the present, composite panel-boards.

The composite panel-boards are made by a novel process comprising the steps of: attaching edge sheets on or adjacent to the mutually opposite side edges of the gypsum board base panel; maintaining the edge sheets in a position extending upwardly from the base panel so that the mutually opposite edge sheets together with the base panel form a trough; heating the upper surface of the base panel to a temperature of at least about 95° F in the presence of a water unsaturated atmopshere, thereby removing moisture from the upper surface layer of the gypsum board base panel; applying a uniform layer of a foamable, liquid, organic plastic material on the upper surface of the base panel, the plastic material being capable of, within a relatively short time period following its being applied on the base panel as a liquid, expanding and reacting to form a layer of rigid, organic plastic foam in-situ on the surface of the base panel; applying a sheet of water-vapor-resistant, flame-retardant material on the exposed surface of the layer of liquid, organic plastic material before the plastic material has had time to react and expand to form the layer of rigid, organic plastic foam; and allowing the liquid, organic plastic material to expand and form a layer of rigid foam adhered on its underside to the gypsum board base panel, and on its upperside to the sheet of water-vapor-resistant, flame retardant material, and on its manually opposite side edges to the respective edge sheets at the mutually opposite side edges of the base panel.

The panel-boards can be made in continuous fashion by continuously positioning the base panels on a conveyor in end-to-end relationship and connecting the abutting ends of the panels together. The edge sheets are continuously applied to the side edges of the interconnected panels as they advance on the conveyor, with the edge sheets being bent upwardly from the side edges of the panels to form a trough betwe3n the two oppositely positioned edge sheets and the top of the panels. The upper surfaces of the panels are heated as the panels move along the conveyor, and the layer of foamable, liquid organic plastic material is continuously applied to the heated, upper surface of the panels. The sheet of water-vapor-resistant, flame-retardant material is continuously applied to the exposed surface of the layer of liquid, organic plastic material immediately following the application of such layer to the heated surface of the column of interconnected panels. The liquid, organic plastic material is allowed to react and expand to form a layer of rigid foam, and the continuously advancing column of interconnected panels on which the layer of rigid foam has been formed is cut into individual boards of desired lengths.

In a preferred mode of continuously fabricating the panels, following the application of the liquid, plastic material to the continuously advancing column of interconnected panels, segmented lateral supports are positioned along the outside faces of the respective edge sheets at the side edges of the interconnected panels. The segments are placed in rectilinear, end-to-end alignment and advanced in the same direction and at the same speed as the conveyor. The edge sheets are, accordingly, held in essentially perpendicular relationship with the column of panels as the liquid, plastic material reacts and expands into the layer of rigid foam, with the edge sheets being adherent to the layer of foam and forming finished edges of the resulting panels boards.

In addition to the segmented lateral supports, it has been found advantageous to provide a segmented, essentially flat, top restraint surface positioned above the top of the advancing column of panels. Following the application of the sheet of water-vapor-resistant, flame-retardant material to the exposed surface of the layer of liquid plastic material, the top restraint surface is positioned a distance above the column of panels equal to the desired thickness of the rigid foam layer. The top restraint surface comprises planar members which are positioned in edge-to-edge, planar relationship with each other, and the members or segments are continuously advanced in the same direction and at the same speed as the column of panels is being conveyed on the conveyor.

THE DRAWINGS

Embodiments representing the best mode presently contemplated of carrying out the invention are illustrated in the accompanying drawings, in which:

FIG. 1 is a perspective view of a composite wall panel of the invention;

FIG. 2, a partial cross-sectional view taken along 2—2 of FIG. 1;

FIG. 3, a view similar to FIG. 2 showing a modified version of the wall panel, wherein the edge sheet and top sheet bounding the edge of the foam layer were allowed to assume the position shown during the formation of the foam layer, with the salvage edge of the panel being trimmed along the dotted line to produce the finished wall panel; and FIG. 4, a schematic type perspective view of a production line for continuously making the wall panels.

DETAILED DESCRIPTION OF THE ILLUSTRATED EMBODIMENTS

Figure 1:
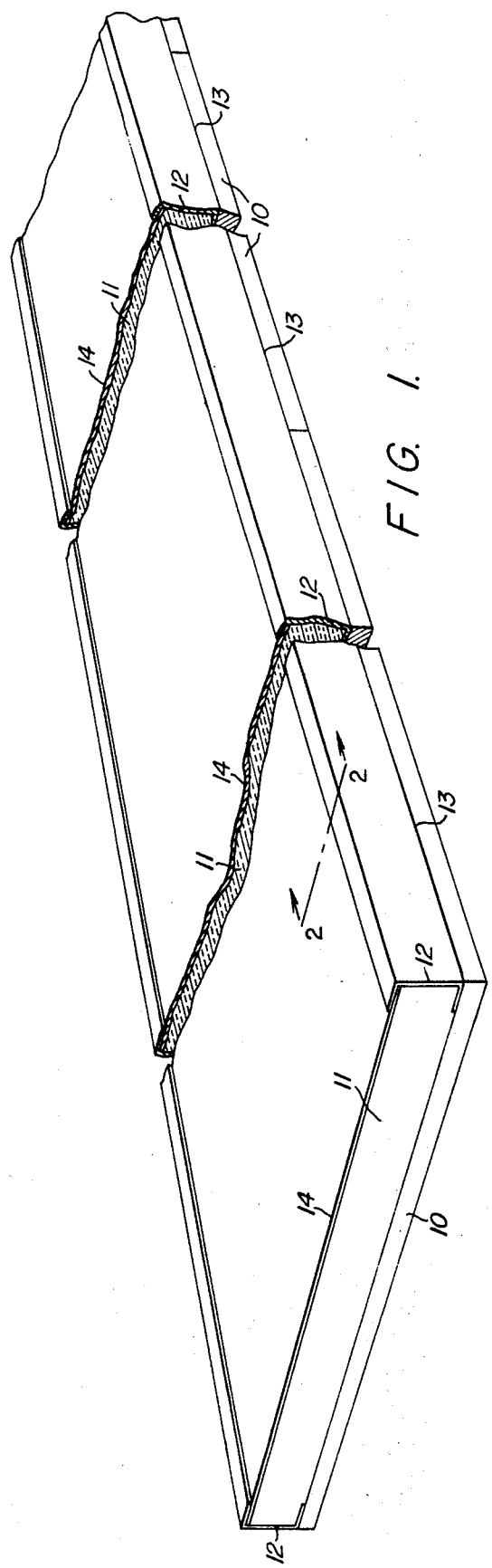
Figure 2:
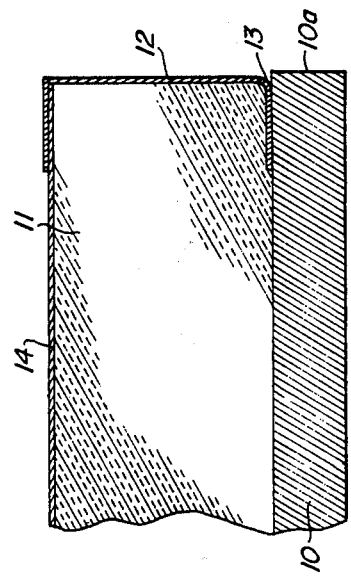

In accordance with the invention, a composite panelboard comprising a rigid, gypsum board, base panel having a rigid, organic plastic, foam layer formed in-situ on, self-adherent to, and covering ore of the broad, flat surfaces of the base panel is provided. As illustrated in FIGS. 1 and 2 the gypsum board base panel 10 has a lyer of rigid plastic foam 11 adherent to one of the broad, flat faces of the base panel. Water-vapor-resistant, flame-retardant, edge sheets 12 are adherent to and covering the respective, mutually opposite, side-edge faces of the plastic foam layer 11. A visible slot 13, FIG. 2, is formed which extends along the mutually opposite, side-edge faces of the composite panel-board between the foam layer 11 and the base panel 10. In the preferred embodiment, as illustrated, the edges of the edge sheets 12 that are adjacent to the gypsum board base panel 10 are turned inwardly between the gypsum board base panel 10 and the plastic foam layer 11 to form the visible slot 13. As mentioned above, the visible slot forms a convenient guide for attaching mechanical fasteners to the composite board when the board is being installed to a supporting structure. Mechanical fasteners which are advantageously used in installing the panels of this invention as well as a method of installing the panels are described in our copending application Ser. No. 691,609, filed June 1, 1976.

The otherwise exposed surface of the plastic foam layer 11 is covered with a water-resistant, flame-retardant layer which is adherent thereto. Preferably, the mutually opposite, side edges 10a of the base panel 10 extend slightly beyond the corresponding edges of the foam layer 11, as shown in FIG. 2. The side edges 10a of the base panel preferably extend beyond the corresponding edges of the foam layer 11 by a distance of up to about ⅛ inch. Having the edges of the foam layer 11 slightly inset from the corresponding edges 10a of the base panel 10 aids in the installation of the base panel in allowing a very small free space between the plastic foam layers of adjacent panels, whereby the panels can be adjusted so that adjacent edges of the gypsum board, base panel make firm, abutting engagement therebetween.

Figure 3:
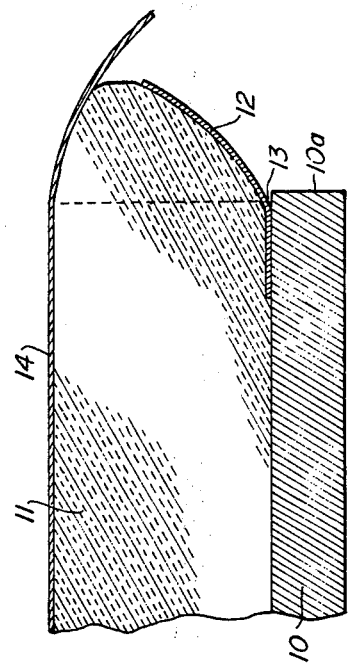

A slight variation in the edge finish of the composite panel is shown in FIG. 3, wherein the edge sheets 12 are not held firmly in an upwardly standing position during the manufacture of the board, and the covering 14 is allowed to overlap the edge sheets 12. Consequently, during the formation of the foam layer 11, the triangular shaped area 11a bounded by the edge sheet 12 and the top covering 14 is filled with foam. To produce a finished edge, the salvage portion 11a of the foam layer is cut away as shown by the dotted line in FIG. 3. The edge of the finished panel board, thus, has the layer of foam exposed rather than covered by a sheet of material as in the embodiment shown in FIGS. 1 and 2. The portion of the edge sheet 12 which remains positioned between the base panel 10 and the foam layer 11 forms the visible slot extending along the edges of the panel.

The plastic foam layer 11 preferably comprises a material selected from the thermosetting and thermoplastic polymers within the class consisting of polyurethane, polyvinyl chloride, polystyrene, phenol formaldehyde, urea formaldehyde, and epoxy resins.

The composite panels are fabricated by a method comprising attaching the edge sheets on or adjacent to the mutually opposite side edges of the base panel. Preferably, one edge of the edge sheets is attached to the upper surface of the base panel adjacent the side edges thereof as is shown in FIGS. 1–3. It is feasible, however, to attach the edge sheets directly to the respective edges of the base panel so that the edge sheets extend upwardly therefrom.

The edge sheets are maintained in a position extending upwardly from the base panel so that the mutually opposite edge sheets together with the base panel form a trough. The edge sheets can be held in a position essentially normal to the base panel to produce a panel as shown in FIG. 2, or they can be allowed to slope away from the base panel as shown in FIG. 3. The essential characteristic of the edge sheets is that they, together with the base panel, form a trough in which a liquid, plastic material can be poured and contained.

The upper surface of the base panel is then heated to a temperature of at least about 95° F. in the presence of a water unsaturated atmosphere, thereby removing moisture from the upper surface layer of the gypsum board base panel. A uniform layer of a foamable, liquid, organic plastic material is applied to the upper surface of the base panel within the trough which is formed between the mutually opposite, upstanding, edge sheets at the respective edges of the base panel. The layer of plastic material is capable of, within a relatively short time period following its being applied on the base panel as a liquid, reacting and expanding itself to form a layer of rigid, organic plastic foam in-situ on the surface of the base panel. A sheet of water-vapor-resistant, flame-retardant material is applied to the exposed surface of the layer of liquid, organic plastic material before the plastic material has had time to expand and form the layer of rigid, organic plastic foam. The liquid, organic plastic material is then allowed to expand and form a layer of rigid foam adhered on its underside to the gypsum board base panel and on its upperside to the sheet of water-vapor-resistant, flame-retardant material.

If the edge sheets attached to the respective sides of the base panel are not held in a substantially normal position with respect to the base panel, the top sheet must be of such a width as to extend from the free side of one of the edge sheets to the free side of the corresponding edge sheet as shown in FIG. 3. Under such circumstances, the layer of liquid, plastic material expands into the area beyond the edges of the base panel but is still constrained between the edge sheets and the top sheet. As explained above, when such a salvage edge is produced, it must be cut from the base panel, as indicated by the dotted line in FIG. 3 to give the panel finished edges. Any salvage at the ends of the panel is also cut away and removed from the finished panel.

It has been found essential to heat the surface of the gypsum board base panel in a moisture unsaturated atmosphere to remove moisture from the upper surface of the panel so that a uniform, strong adhesion is developed between the foamed layer and the gypsum board base panel. In the absence of such heating and drying, non-uniform cell formation occurs at the interface between the gypsum board base panel and the layer of foamed plastic. Large pores are formed adjacent the face of the gypsum board, and these pores connect to each other to form worm-hole like tunnels extending outwardly from and along the face of the gypsum board. This non-uniform pore formation results in the layer of foam having greatly reduced adhesion to the gypsum board. By heating and drying the surface layer of the gypsum board in accordance with this invention, uniform pore formation is achieved at the face of the gypsum board with greatly increased adhesion of the foam layer to the gypsum board. Preferably, the upper surface of the gypsum board base panel is heated to a temperature of between about 95° F to 200° F prior to the application of the liquid plastic material thereto.

Figure 4:
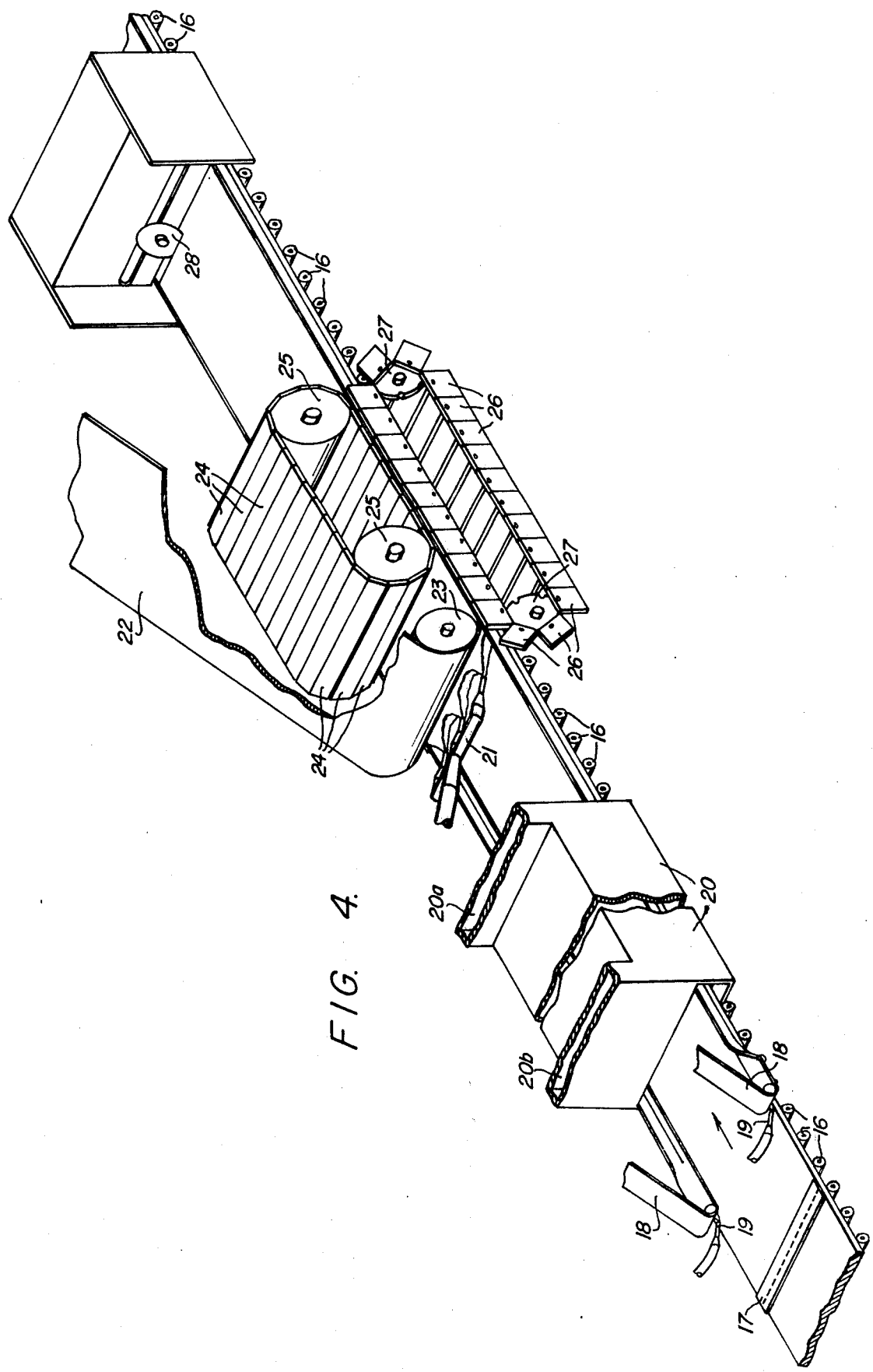

The composite panels are advantageously made in continuous fashion by a method which will be described with reference to FIG. 4. Individual panels of gypsum board are placed on a conveyor 16 in end-to-end, abutting relationship, and the abutting ends are attached together as by securing with tape as shown by the numeral 17 in FIG. 4. The connected panels of gypsum board form a column which continuously moves on the conveyor. Edge sheets 18 of a water-vapor-resistant, flame-retardant material are applied to the respective, opposite sides of the column of gypsum board base panels as it moves along the conveyor. As illustrated, ribbons of glue or adhesive are applied by nozzles 19 to the top of the column of panels adjacent to the respective sides thereof, and the edge sheets 18 are fed continuously into contact with the ribbon of glue or adhesive so that the edge sheets extend outwardly from the corresponding edges of the column of panels. The free edges of the edge sheets are then bent upwards so that the edge sheets extend substantially perpendicularly upward from the panels at the corresponding edges thereof, thereby forming a trough.

The column of panels, with the upstanding side sheets continuously advances on the conveyor 16 through a heating unit 20 which heats the upper surface of the panels to a temperature of at least about 95° F in the presence of a water unsaturated atmosphere, to remove moisture from the upper surface layer of the panels. The heating unit is advantageously formed as a plenum with hot, dry air entering one end of the plenum through an entry duct 20a. The hot air flows over the gypsum board panels which are moving through the heater 20. Exhausted heating air is expelled from the plenum through exhaust duct 20b. The surface of the gypsum board panels is preferably heated to a temperature between about 95° F and 200° F as the column of panel boards progress through the heater 20.

As the column of panels emerge from the heater 20, a uniform layer of a foamable, liquid, organic plastic material is continuously applied through distribution nozzle 21 to the surface of the panels as the panels move along the conveyor 16. A sheet of water-vapor-resistant, flame-retardant material 22 is applied to the upper surface of the layer of liquid organic plastic material before the plastic material has had time to react and expand to form the layer of plastic foam. As illustrated, the sheet of material 22 is continuously fed around a roller 23 which extends longitudinally across the face of the column of panel-boards as they are moving along conveyor 16. The roller 23 can be adjusted to preset distances above the surface of the panel-boards. The thickness of the layer of plastic material being applied to the panel-boards is controlled by adjusting the amount of material being applied through nozzle 21 and the distance between the surface of the panel-boards and the roller 23. The sheet of material 22 is brought into intimate contact with the surface of the layer of liquid plastic material, and as the column of panels move along the conveyor past the roller 23, the plastic material begins to react and expand to form a layer of plastic foam material confined between the gypsum board panels, the edge sheets, and top sheet of water-vapor-resistant, flame-retardant material.

To produce a uniformly thick layer of foam having finished edges, a continuous series of segmented, lateral side supports 26 are positioned along the outside faces of the respective edge sheets at the side edges of the column of panels and a continuous series of segmented, essentially flat top supports 24 are positioned above the top sheet of water-vapor-resistant, flame-retardant material 24 at a distance above the panels equal to the desired thickness of the rigid foam layer. The lateral side supports 26 and the top supports 24 are advantageously attached consecutively into respective continuous belt fashion and moved around respective rollers. The lateral side supports 26 move in continuous fashion around rollers 27 and the top supports 24 move around rollers 25. The movement of the lateral supports 26 and top supports 24 is controlled so that the respective members thereof move in the same direction and at the same speed as the column of panels move on the conveyor 16. The series of side supports 26 and top supports 24 form firm side and top restraints for the formation of the layer of plastic foam, and the resulting composite panel-board has a foam layer having a smooth upper finish, a uniform thickness, and smooth, finished side edges.

The continuous column of panels moving from the plastic foam forming area is finally cut into individual, composite panel-boards of desired length. Preferably, the continuous column is cut transversely thereacross adjacent the abutting ends of the gypsum board base panels. This is accomplished by synchronizing a cutting saw 28 to initiate a cut across the column at a point corresponding to the abutting ends of the gypsum board base panels. As the saw 28 moves transversely across the panel board column, it is also moved along the conveyor 16 at the same speed and in the same direction as the panel board column is moving thereon. The saw 28 cuts the rigid foam layer, the water-vapor-resistant, flame-retardant top sheet, and the edge sheets, but is set so that it does not cut the gypsum board base panel. Once the panel board column passes beyond the cutting zone, the segments between succeeding cuts therein are subjected to a longitudinal stress sufficient to separate the abutting ends of the respective gypsum board base panels. By cutting the composite panels at a point adjacent the ends of the abutting gypsum board base panels, without actually cutting through the gypsum board, the ends of the resulting composite panel boards comprise cleanly cut foam sections with the factory finish on the ends of the gypsum board component.

Whereas this invention is here illustrated and described with reference to preferred embodiments which are presently contemplated as encompassing the best mode of carrying out the invention, it is to be understood that various changes may be made in adapting the invention to different embodiments without departing from the broader inventive concepts disclosed herein and comprehended by the claims that follow.

We claim:

1. A composite panel board, comprising a rigid, gypsum board, base panel having mutually opposite, broad, flat surfaces; a rigid, organic plastic, foam layer formed in-situ on, self-adherant to, and covering one of the broad, flat surfaces of said gypsum board base panel; a visible slot extending along the mutually opposite, side-edge faces of the composite board between the foam layer and the base panel; and a water-vapor-resistant, flame-retardant layer adherant to and covering the otherwise exposed, broad surface of said foam layer.

2. A composite panel board in accordance with claim 1, including water-vapor-resistant, flame-retardant, edge sheets adherant to and covering respectively, the mutually opposite, side-edge faces of said plastic foam layer.

3. A composite board in accordance with claim 2, wherein the edges of the edge sheets that are adjacent to the gypsum board base panel are turned inwardly between the gypsum board base panel and the plastic foam layer to form said visible slot extending along the corresponding edge faces of the composite board.

4. A composite panel board in accordance with claim 1, wherein the mutually opposite, side edges of the base panel extend slightly beyond the corresponding edges of the foam layer.

5. A composite panel board in accordance with claim 4, wherein the mutually opposite, side edges of the base panel extend slightly beyond the corresponding edges of the foam layer by a distance of up to about ⅛ inch.

6. A composite panel board in accordance with claim 1, wherein the organic plastic foam layer comprises a material selected from the thermosetting and thermoplastic polymers within the class consisting of polyurethane, polyvinyl chloride, polystyrene, phenol formaldehyde, urea formaldehyde, and epoxy resins.

7. A method of fabricating a composite panel board which is made up of a rigid, gypsum board base panel having a rigid, organic plastic, foam layer and substantially covering one of the broad, flat surfaces of said gypsum board base panel, with the foam layer being formed in-situ on and self-adherant to said one of the broad, flat surfaces of said gypsum board, said method comprising attaching edge sheets on or adjacent to the mutually opposite side edges of said base panel; maintaining the edge sheets in a position extending upwardly from the base panel so that the mutually opposite edge sheets together with said base panel form a trough; heating the upper surface of the base panel to a temperature of at least about 95° F in the presence of a water unsaturated atmosphere, thereby removing moisture from the upper surface layer of the gypsum board base panel; applying a uniform layer of a foamable, liquid, organic plastic material on the upper surface of the base panel, said plastic material being capable of, within a relatively short time period following its being applied on the base panel as a liquid, expanding and forming itself into a layer of rigid, organic plastic foam in-situ on the surface of the base panel; applying a sheet of water-vapor-resistant, flame-retardant material to the exposed surface of the layer of liquid, organic plastic material before the plastic material has had time to expand and form said layer of rigid, organic plastic foam; and allowing the liquid, organic plastic material to expand and form a layer of rigid foam adhered on its underside to the gypsum board base panel and on its upperside to the sheet of water-vapor-resistant, flame-retardant material.

8. A method in accordance with claim 7, wherein salvage at the sides and ends of the composite board obtained following the formation of the rigid foam layer are removed so as to produce uniform, finished edge faces on the sides and ends of the composite board.

9. A method in accordance with claim 7, wherein the upper surface of the base panel is heated to a temperature of between about 95° F to about 200° F prior to applying the layer of liquid, organic plastic material thereon.

10. A method in accordance with claim 8, wherein the composite boards are made in continuous fashion by (a) continuously positioning said base panels on a conveyor in end-to-end relationship; (b) connecting the abutting ends of the end-to-end base panels together; (c) continuously applying the edge sheets to the side edges of the base panels as they advance on said conveyor; (e) continuously bending the edge sheets upwardly from the side edges of the base panels as they advance on said conveyor from step (d); (f) continuously heating the upper surface of the base panels as they advance on said conveyor from step (e); (g) continuously applying a uniform layer of a foamable, liquid, organic plastic material on the upper surface of the base panels as they advance on said conveyor from step (f); (h) continuously applying a sheet of water-vapor-resistant, flame-retardant material to the exposed surface of the layer of liquid, organic plastic material as the base panels advance on said conveyor from step (g); (i) allowing the liquid, organic plastic material to expand and form a layer of rigid foam as the base panels advance on said conveyor from step (h); and (j) cutting the continuous panel board from step (i) to individual panel boards of desired lengths.

11. A method in accordance with claim 10, wherein the side edges of the rigid foam layer on the panels are trimmed to be from about ⅛ inch short of the edge of the base panel to even with the edge of the base panel.

12. A method in accordance with claim 10, wherein following the application of the liquid, plastic material to the base panel, segmented lateral supports are positioned along the outside faces of the respective edge sheets at the side edges of the base panel, the segments of the lateral supports being in rectilinear, end-to-end alignment, and the segments are continuously advanced in the same direction and at the same speed as the conveyor, whereby the edge sheets are held essentially perpendicular to the gypsum board as the liquid, plastic material expands into the layer of rigid foam, with the edge sheet being adherant to the layer of rigid foam and forming a finished edge of the panel-board.

13. A method in accordance with claim 12, wherein following the application of the sheet of water-vapor-resistant, flame-retardant material to the exposed surface of the layer of liquid plastic material, a segmented, essentially flat, top restraint surface is positioned above said sheet of water-vapor-resistant, flame-retardant material at a distance above the base panel equal to the desired thickness of the rigid foam layer, the segments of the top restraint surface being flat, planar members which are positioned in edge-to-edge, planar relationship with each other, and the segments are continuously advanced in the same direction and at the same speed as the conveyor upon which the base panel is being conveyed.

14. A method in accordance with claim 10, wherein the liquid, organic plastic material comprises a polymer selected from the group consisting of polyurethane, polyvinyl chloride, polystyrene, phenol formaldehyde, urea formaldehyde and, epoxy resins.

15. A method in accordance with claim 10, wherein the continuous panel board from step (i) is cut in step (j) transversely thereacross adjacent the abutting ends of the gypsum board base panels by cutting the rigid foam layer, the water-vapor-resistant, flame-retardant top sheet, and the edge sheets adjacent the abutting ends of the gypsum board base panels and then separating the connected, abutting ends of the respective gypsum board base panels.

* * * * *